(12) United States Patent
Doo et al.

(10) Patent No.: US 10,193,125 B2
(45) Date of Patent: Jan. 29, 2019

(54) ELECTRODE ASSEMBLY AND SECONDARY BATTERY INCLUDING THE SAME

(71) Applicant: SAMSUNG SDI CO., LTD., Yongin-si, Gyeonggi-do (KR)

(72) Inventors: Jae Gyun Doo, Yongin-si (KR); Hyun Ki Jung, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 181 days.

(21) Appl. No.: 15/266,996

(22) Filed: Sep. 15, 2016

(65) Prior Publication Data

US 2017/0092926 A1 Mar. 30, 2017

(30) Foreign Application Priority Data

Sep. 24, 2015 (KR) .......................... 10-2015-0135656

(51) Int. Cl.
*H01M 2/26* (2006.01)
*H01M 4/02* (2006.01)
(Continued)

(52) U.S. Cl.
CPC ............. *H01M 2/263* (2013.01); *H01M 2/26* (2013.01); *H01M 4/02* (2013.01); *H01M 4/75* (2013.01);
(Continued)

(58) Field of Classification Search
None
See application file for complete search history.

(56) References Cited

U.S. PATENT DOCUMENTS 6,235,426 B1 * 5/2001 Yanai .................... H01M 2/263
429/178
8,846,243 B2   9/2014 Ryu et al.
(Continued)

FOREIGN PATENT DOCUMENTS

EP    1020943 A1   7/2000
EP    2709187 A1   3/2014
(Continued)

OTHER PUBLICATIONS

Abstract of Japanese Publication No. 10-261439, Sep. 29, 1998, corresponding to Japanese Patent No. 3140977 B2, Mar. 5, 2001, 1 page.
(Continued)

*Primary Examiner* — Scott J. Chmielecki
(74) *Attorney, Agent, or Firm* — Lewis Roca Rothgerber Christie LLP

(57) ABSTRACT

An electrode assembly includes: an electrode plate which is wound together with an electrode plate having a different polarity and then formed in a form of a jelly roll and includes a plurality of non-coated portions that are spaced apart from each other; and a plurality of tabs attached to the plurality of non-coated portions, respectively, in which the plurality of non-coated portions includes a first non-coated portion having a set or predetermined width, and a second non-coated portion having a different width from the width of the first non-coated portion. According to the exemplary embodiments of the present invention, it is possible to more easily align and bond multiple tabs, and weld the multi-tab structure to a CID (or a can). Furthermore, it is possible to increase an output of a secondary battery by reducing resistance of the battery.

16 Claims, 7 Drawing Sheets

(51) Int. Cl.
*H01M 10/04* (2006.01)
*H01M 4/75* (2006.01)

(52) U.S. Cl.
CPC .... *H01M 10/0431* (2013.01); *H01M 2220/20* (2013.01); *H01M 2220/30* (2013.01)

(56) References Cited

U.S. PATENT DOCUMENTS

| | | | |
|---|---|---|---|
| 9,012,053 B2* | 4/2015 | Chun | H01M 10/0431 429/122 |
| 2005/0003264 A1* | 1/2005 | Oh | H01M 2/263 429/94 |
| 2006/0126263 A1* | 6/2006 | Tsunekawa | H01G 9/155 361/301.1 |
| 2011/0067227 A1* | 3/2011 | Sohn | H01M 2/22 29/623.1 |
| 2011/0111276 A1 | 5/2011 | Sato et al. | |
| 2011/0151295 A1* | 6/2011 | Kim | H01M 2/263 429/94 |
| 2012/0009450 A1* | 1/2012 | Chun | H01M 2/023 429/94 |
| 2012/0177963 A1 | 7/2012 | Lee et al. | |
| 2014/0087245 A1 | 3/2014 | Lee et al. | |
| 2014/0349179 A1* | 11/2014 | Chun | H01M 10/4235 429/211 |
| 2015/0194639 A1 | 7/2015 | Jeoung et al. | |
| 2015/0295270 A1* | 10/2015 | Chun | H01M 10/0431 429/94 |

FOREIGN PATENT DOCUMENTS

| | | |
|---|---|---|
| EP | 2750221 A1 | 7/2014 |
| JP | 7-192717 A | 7/1995 |
| JP | 3140977 B2 | 3/2001 |
| KR | 10-2008-0009351 A | 1/2008 |
| KR | 10-1095343 B1 | 12/2011 |
| KR | 10-2012-0006389 A | 1/2012 |
| KR | 10-2012-0133026 A | 12/2012 |
| KR | 10-1262086 B1 | 5/2013 |
| KR | 10-2013-0076838 A | 7/2013 |
| KR | 10-2015-0000159 A | 1/2015 |
| KR | 10-2015-0081730 A | 7/2015 |

OTHER PUBLICATIONS

Abstract of Korean Publication No. 20070056493 A, Jun. 4, 2007, corresponding to Korean Patent No. 10-1095343 B1, Dec. 16, 2011, 1 page.

EPO Extended Search Report dated Feb. 8, 2017, for corresponding European Patent Application No. 16190471.9 (6 pages).

* cited by examiner

ELECTRODE ASSEMBLY AND SECONDARY BATTERY INCLUDING THE SAME

CROSS-REFERENCE TO RELATED APPLICATION

This application claims priority to and the benefit of Korean Patent Application No. 10-2015-0135656, filed on Sep. 24, 2015, in the Korean Intellectual Property Office, the content of which is incorporated herein by reference in its entirety.

BACKGROUND

1. Field

The following description relates to an electrode assembly enhanced for a multi-tab structure, and a secondary battery including the same.

2. Description of the Related Art

A secondary battery is a battery that can be recharged and discharged, and is thus repeatedly usable. A secondary battery has been utilized as an energy source of a portable electronic device, an electric tool, a garden tool, an Electric Vehicle (EV), a power storage system, and/or the like, and has been widely examined for applications to various suitable fields.

Recently, there is a need for an electric tool, a garden tool, an EV, an E-bike and/or the like to utilize a secondary battery with a cell having a higher output.

In this application field, a cylindrical secondary battery is generally utilized, and the cylindrical secondary battery has a set (e.g., pre-determined or given) available volume. Therefore, there is considerable difficulty in increasing its capacity and its output. In order to increase an output; the resistance of a battery needs to be decreased, and to this end, it has been effective to increase the number of tabs of an electrode plate within a limited volume. However, when the number of tabs is increased, there incurs many limits in a process of welding the tabs with a Current Interrupt Device (CID) and/or with a can (e.g., the process of welding the multiple tabs with a Current Interrupt Device (CID) or with a can becomes more difficult).

SUMMARY

An aspect according to one or more embodiments of the present invention is directed toward an electrode assembly enhanced for a multi-tab structure, and a secondary battery including the same.

Other aspects or objects of the present invention will be derivable by those skilled in the art through one or more exemplary embodiments below.

According to an exemplary embodiment of the present invention, an electrode assembly includes: a jelly roll including a first electrode plate wound together with a second electrode plate, the second electrode plate having a different polarity from the the first electrode plate. The first electrode plate includes a plurality of non-coated portions spaced apart from each other; and a plurality of tabs attached to the plurality of non-coated portions, respectively. The plurality of non-coated portions includes a first non-coated portion having a first width, and a second non-coated portion having a second width different from the first width of the first non-coated portion.

The first non-coated portion is between a winding center of the jelly roll and the second non-coated portion.

The first non-coated portion and the second non-coated portion may have an overlap section having a width equal to or larger than a width of any one of the plurality of tabs therebetween.

The first non-coated portion and the second non-coated portion may have an overlap section having a width equal to or larger than a width of a tab having a smallest width among the plurality of tabs.

The overlap section may be defined by a region in which a first angle overlaps with a second angle, the first angle defined by lines passing through the winding center and both ends of the first non-coated portion, respectively, and the second angle defined by lines passing through the winding center and both ends of the second non-coated portion, respectively.

At least one tab among the plurality of tabs is laid on the second non-coated portion within the overlap section.

The tab having the smallest width among the plurality of tabs is laid on the second non-coated portion within the overlap section.

The second non-coated portion may have a larger width than that of the first non-coated portion.

The second non-coated portion may have a larger width than that of the first non-coated portion, the plurality of tabs may include a first tab attached to the first non-coated portion and a second tab attached to the second non-coated portion, and the second tab may have a smaller width than that of the first tab.

The first non-coated portion may have a larger width than that of the second non-coated portion.

The first non-coated portion may have a larger width than that of the second non-coated portion, the plurality of tabs may include a first tab attached to the first non-coated portion and a second tab attached to the second non-coated portion, and the first tab may have a smaller width than that of the second tab.

According to another exemplary embodiment of the present invention, an electrode assembly includes: a jelly roll including a first electrode plate wound together with a second electrode plate, the second electrode plate having a different polarity from the first electrode plate. The first electrode plate includes a plurality of non-coated portions spaced apart from each other; and a plurality of tabs attached to the plurality of non-coated portions, respectively. The plurality of tabs includes a first tab having a first width, and a second tab having a second width different from the first width of the first tab.

The first tab may be between a winding center of the jelly roll and the second tab, and the second tab may have a smaller width than that of the first tab.

Yet according to another exemplary embodiment of the present invention, a secondary battery includes the above described electrode assembly.

According to the exemplary embodiments of the present invention, it is possible to provide an electrode assembly enhanced for a multi-tab structure for reducing the resistance of a battery.

Further, according to the exemplary embodiments of the present invention, it is possible to more easily align and bond multiple tabs, and weld the multi-tab structure to a CID (or a can).

Furthermore, according to the exemplary embodiments of the present invention, it is possible to increase an output of a secondary battery by reducing the resistance of the battery.

BRIEF DESCRIPTION OF THE DRAWINGS

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey the scope of the example embodiments to those skilled in the art.

Figure 1A:
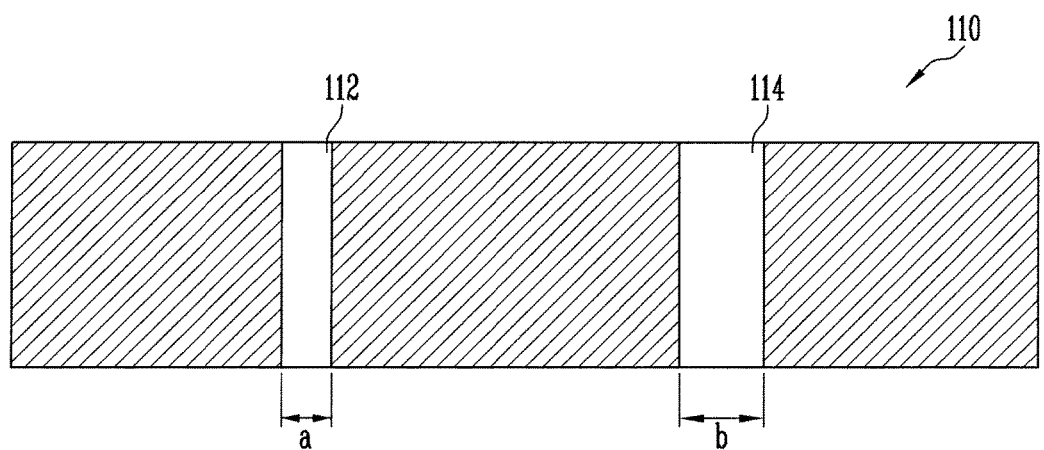

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 1A is a diagram illustrating a state before an electrode plate is wound according to an exemplary embodiment of the present invention.

Figure 1B:
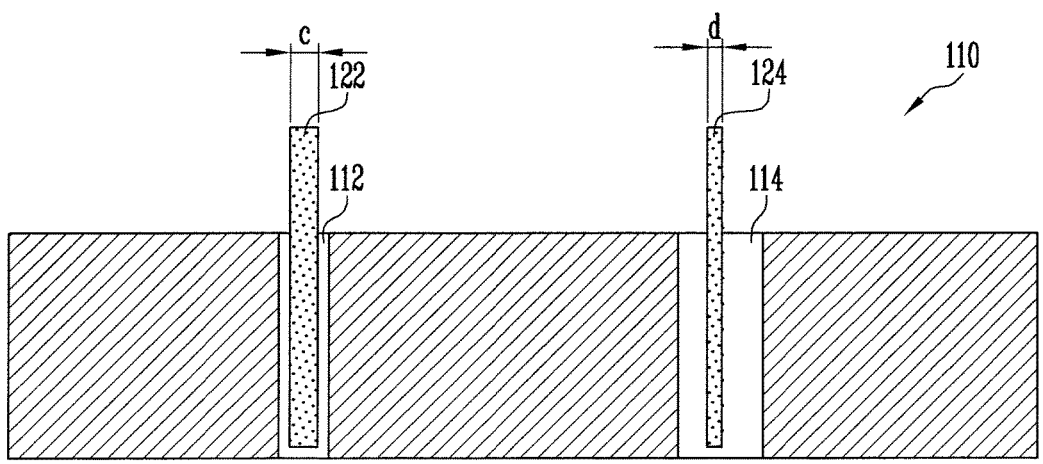

FIG. 1B is a diagram illustrating a state where tabs are attached to the electrode plate of FIG. 1A according to the exemplary embodiment of the present invention.

Figure 1C:
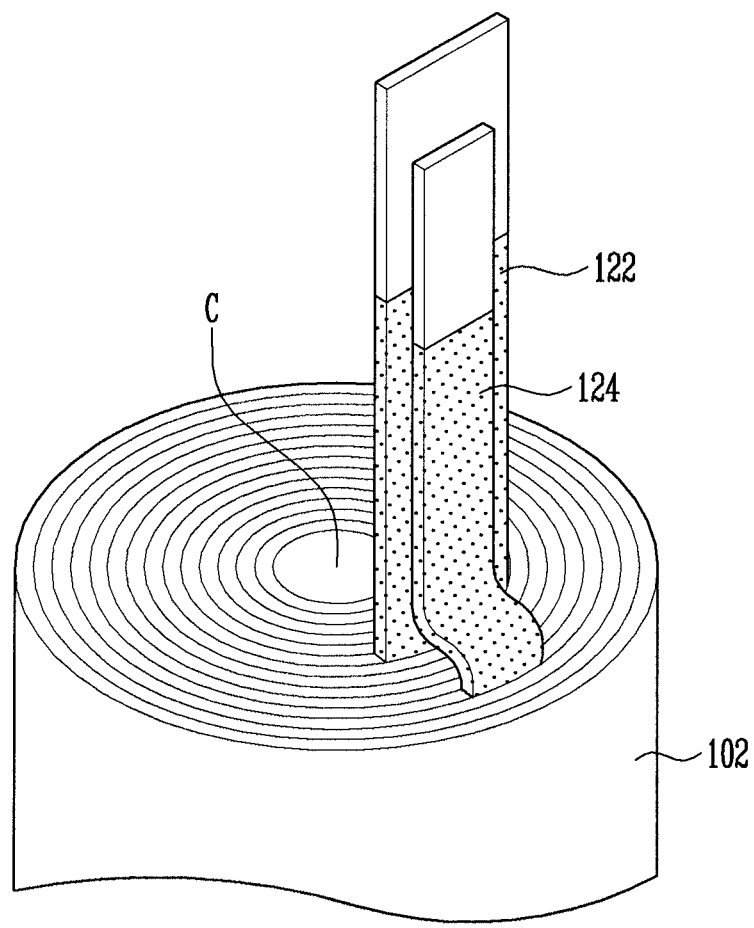

FIG. 1C is a diagram illustrating a state where the electrode plate, to which the tabs shown in FIG. 1B are attached, is wound together with another electrode plate having a different polarity and a separator interposed between the electrode plates according to the exemplary embodiment of the present invention.

Figure 2A:
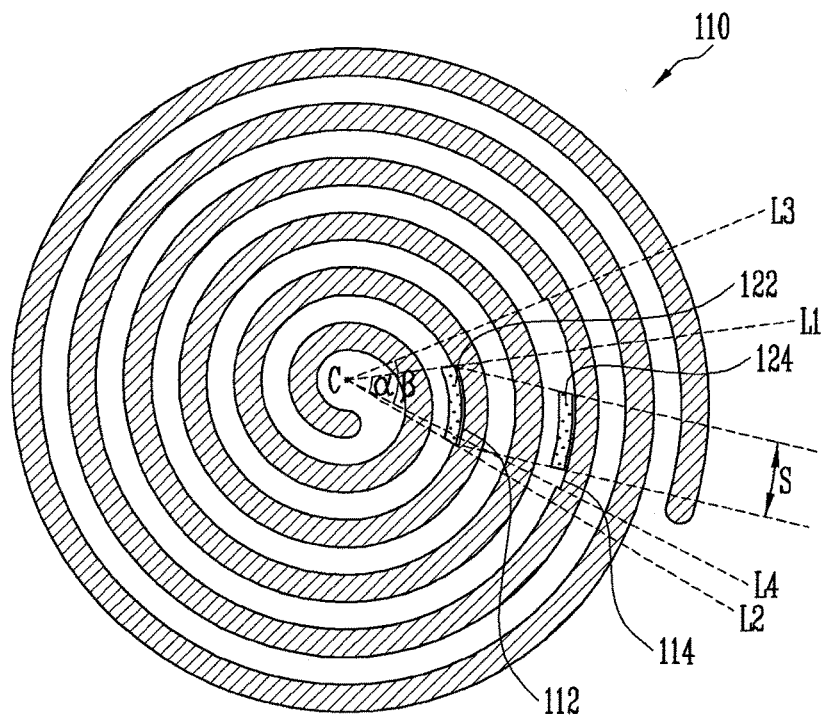

FIG. 2A is a horizontal cross-sectional view of a jelly roll of FIG. 1C according to an exemplary embodiment of the present invention.

Figure 2B:
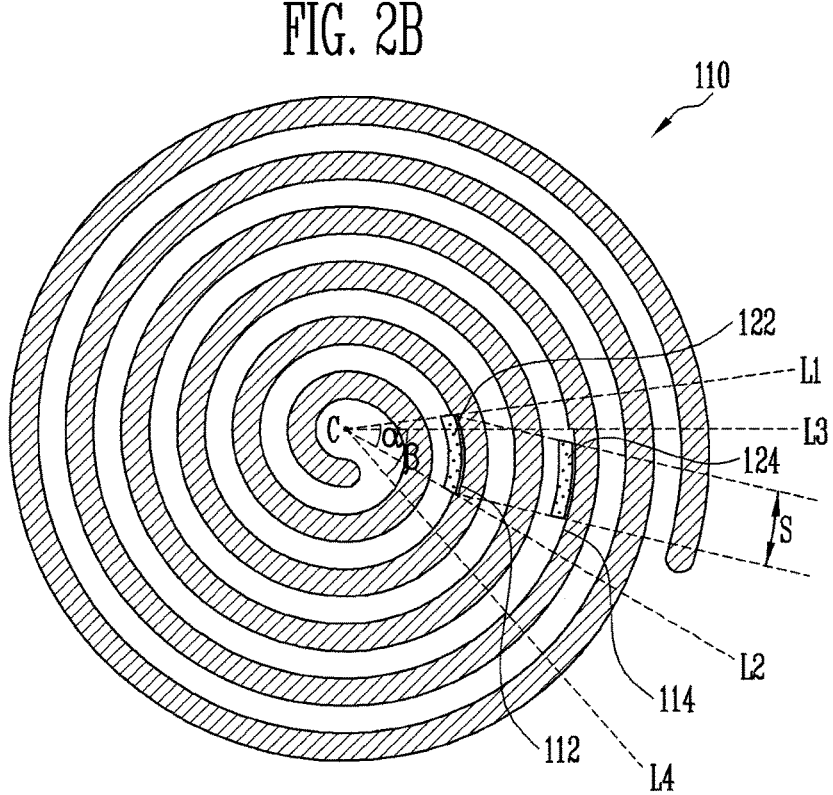

FIG. 2B is a horizontal cross-sectional view of a jelly roll of FIG. 1C according to an exemplary embodiment of the present invention.

Figure 3:
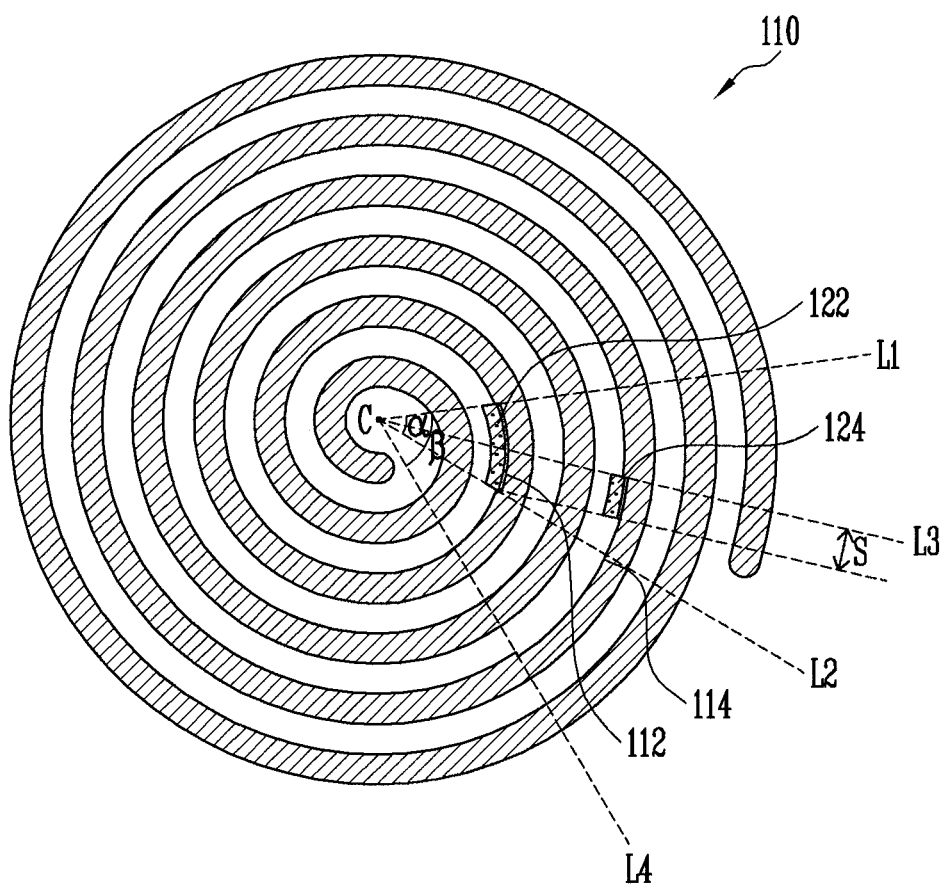

FIG. 3 is a horizontal cross-sectional view of a jelly roll of FIG. 1C according to an exemplary embodiment of the present invention.

Figure 4A:
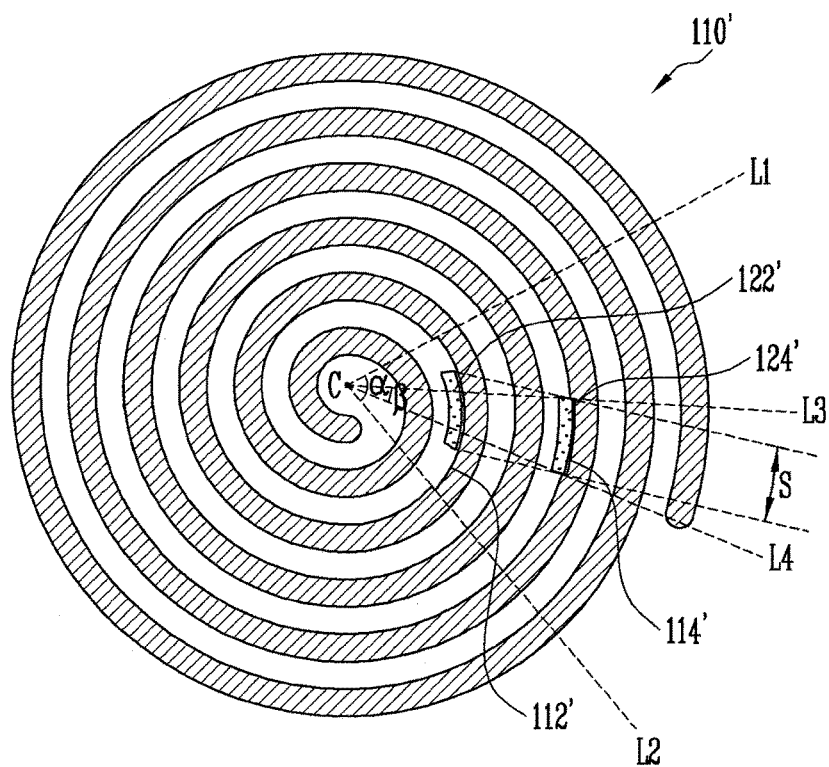

FIG. 4A is a horizontal cross-sectional view of a jelly roll of FIG. 1C according to an exemplary embodiment of the present invention.

Figure 4B:
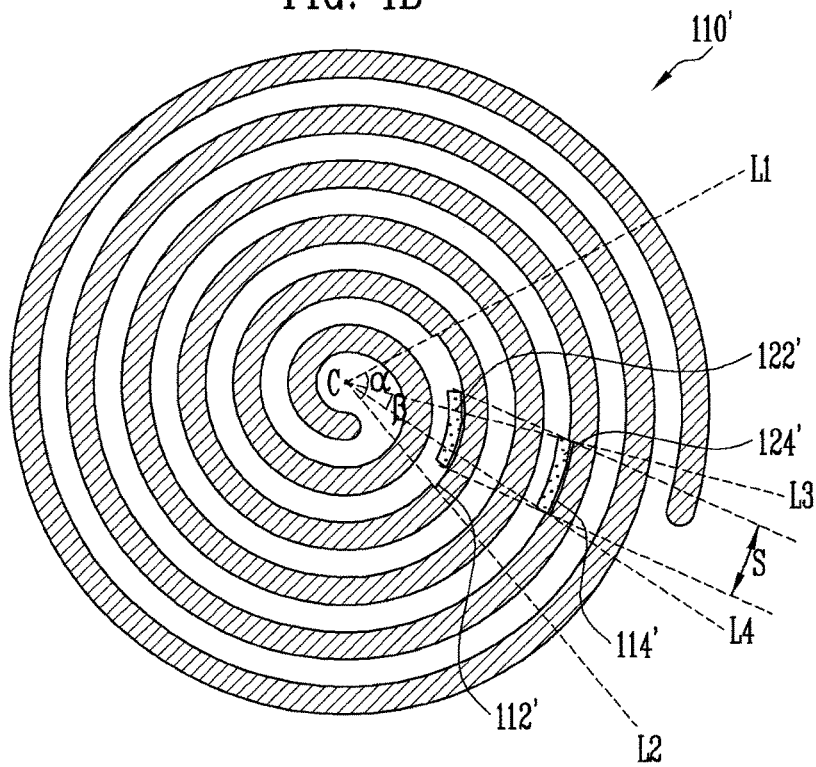

FIG. 4B is a horizontal cross-sectional view of a jelly roll of FIG. 1C according to an exemplary embodiment of the present invention.

Figure 5:
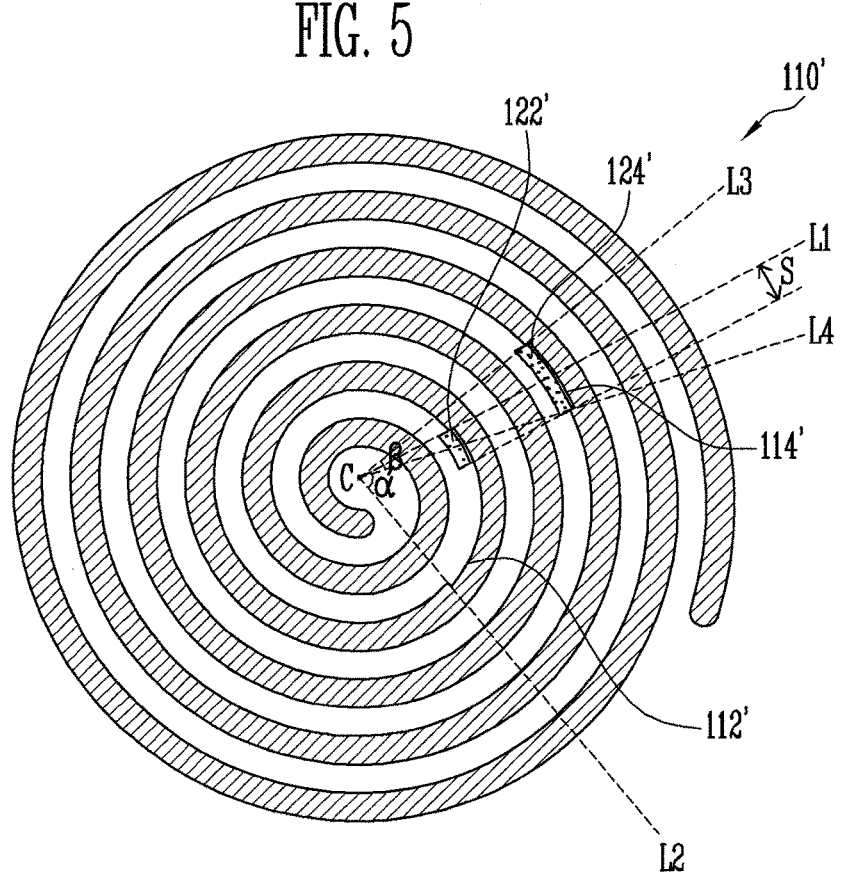

FIG. 5 is a horizontal cross-sectional view of a jelly roll of FIG. 1C according to an exemplary embodiment of the present invention.

Figure 6:
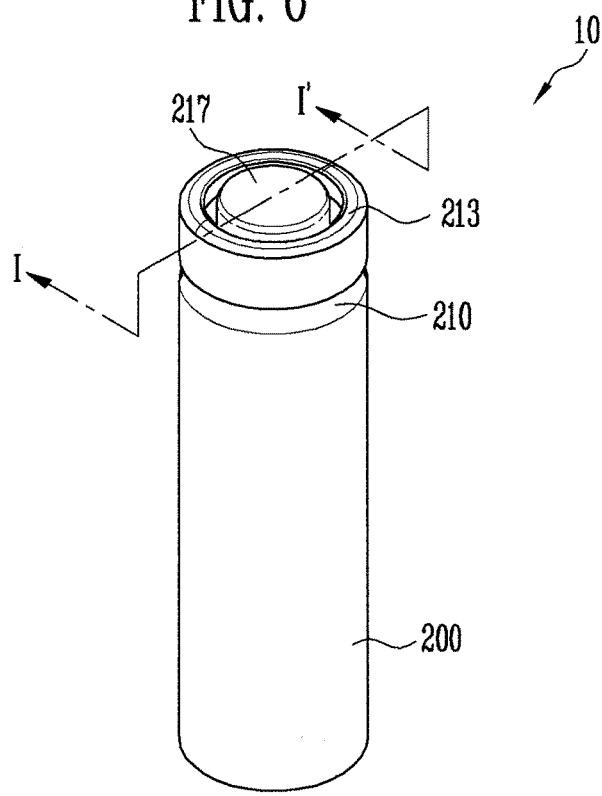

FIG. 6 is a perspective view of an exterior appearance of a secondary battery including the electrode assembly according to an exemplary embodiment of the present invention.

Figure 7:
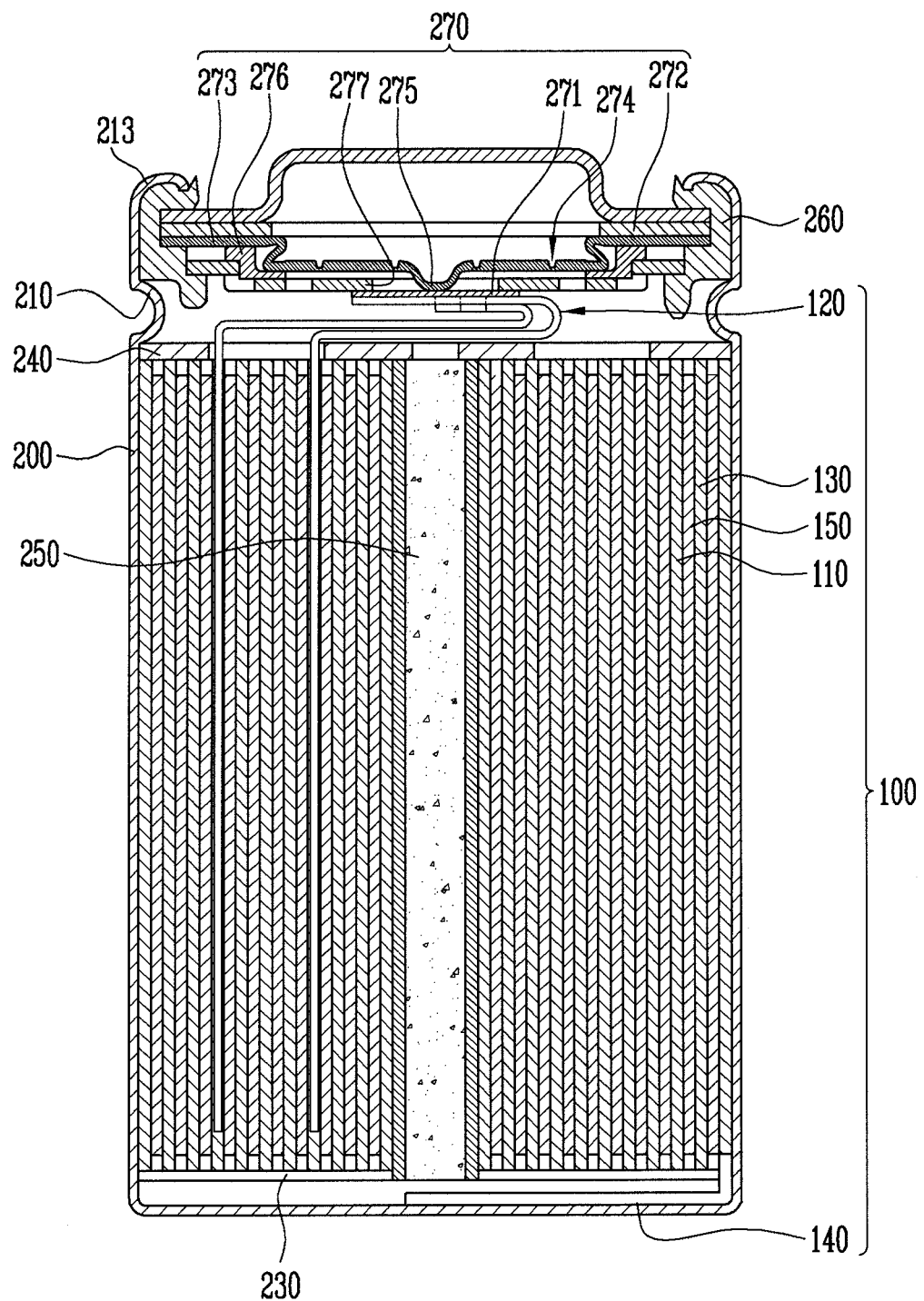

FIG. 7 is an exploded perspective view taken along line I-I' of FIG. 6.

DETAILED DESCRIPTION

The present invention may be variously modified and have various exemplary embodiments. While specific embodiments will be illustrated in the drawings and described in the detailed description, it is not intended to limit the scope of the present invention to the specific embodiments, and it will be appreciated that the scope of the present invention includes all modifications, equivalences, or substitutions included in the spirit and the technical scope of the present invention. In the description of respective drawings, similar reference numerals designate similar elements.

Hereinafter, exemplary embodiments of the present invention will be described in more detail with reference to accompanying drawings.

FIG. 1A is a diagram illustrating a state before an electrode plate 110 is wound according to an exemplary embodiment of the present invention.

FIG. 1B is a diagram illustrating a state in which tabs 122 and 124 are attached to the electrode plate 110 of FIG. 1A according to the exemplary embodiment of the present invention.

Further, FIG. 1C is a diagram illustrating a state where the electrode plate 110, to which the tabs shown in FIG. 1B are attached, is wound together with another electrode plate having a different polarity and a separator interposed between the electrode plates according to the exemplary embodiment of the present invention.

First, as illustrated in FIGS. 1A and 1B, the electrode plate 110 includes a plurality of non-coated portions 112 and 114, which are spaced apart from each other.

The non-coated portion is a portion in the electrode plate onto which an active material is not applied, and is distinguished from a coated portion, onto which the active material is coated.

In the present invention, for convenience of the description, it is assumed that the number of (the plurality of) the non-coated portions is two, but it is not limited thereto, and three or more non-coated portions may exist.

The plurality of non-coated portions 112 and 114 may include a first non-coated portion 112 close to a side at which winding starts, that is, close to a winding center C, and a second non-coated portion 114 positioned at an outer side of the first non-coated portion 112 after the winding (see FIG. 1C).

In this case, the first non-coated portion and the second non-coated portion may be positioned while being spaced apart from each other at a relative center (e.g., being spaced apart radially), not both ends of an entire length of the electrode plate (e.g., not positioned on a respective end of the electrode plate and being spaced apart at an entire length of the electrode plate).

The first non-coated portion 112 has a set or predetermined width a, and the second non-coated portion 114 has a width b different from the width of the first non-coated portion. In FIG. 1A, it is illustrated that b is larger than a, but an opposite case thereof is acceptable, which will be described below. This is for the purpose of expandably distributing an overlap section S between the non-coated portions so as to adjust an alignment between the tabs (e.g., this is for the purpose of providing an overlap section S between the non-coated portions to allow adjustment on the position of the one or more of the tabs to align the tabs), which will be described in more detail with reference to FIGS. 2A to 5.

A plurality of tabs 122 and 124 is attached to the plurality of non-coated portions 112 and 114, respectively. When the plurality of non-coated portions is three (e.g., when there are three non-coated portions), the plurality of tabs is also three (e.g., the number of tabs is also three), and each of the tabs may be attached to one of the non-coated portions, respectively.

The plurality of tabs 122 and 124 (correspond to a multi-tab structure) are capable of reducing the resistance of a battery to increase its output. A first tab 122 is attached to the first non-coated portion to protrude to the outside of a jelly roll 102, and a second tab 124 is attached to the second non-coated portion 114 to protrude to the outside of the jelly roll 102.

The first tab 122 has a set or predetermined width c, and the second tab 124 has a width d different from the width of the first tab. In FIG. 1B, it is illustrated that d is smaller than c, but d may be the same as c, or d may be larger than c, which will be described below. This is for the purpose of expandably distributing an overlap section S between the non-coated portions so as to adjust an alignment between the tabs, which will be described in more detail with reference to FIGS. 2A to 5.

Next, as illustrated in FIG. 1C, the protruding portions of the first and second tabs 122 and 124 may be aligned in a row (e.g., aligned to overlap with each other, e.g., one of the tabs is aligned to completely overlap with the other tab), and finally bonded to each other to be welded with a Current Interrupt Device (CID) or a can.

According to the exemplary embodiment of the present invention, it is easy to align the first and second tabs 122 and 124 to form the multi-tab structure, and thus a process of welding the multi-tab structure with the CID or the can may be easy. A structure of the electrode assembly 100 according to an exemplary embodiment of the present invention will be described in more detail with reference to FIGS. 2A to 5.

Here, the jelly roll 102 is one in which a positive electrode plate, a negative electrode plate, and a separator interposed between the electrode plates are wound together in the form of a jelly roll. In FIGS. 2A to 5, for convenience of the description, reference numeral of the negative electrode plate and the separator wound together with the positive electrode plate 110 will be omitted (e.g., will not be provided). However, the structure of the electrode plate 110 according to an exemplary embodiment of the present invention is equally applicable to the negative electrode plate.

FIGS. 2A, 2B, and 3 are horizontal cross-sectional views (e.g., cross-sectional views taken along a plane perpendicular to the winding core axis) of the jelly roll 102 of FIG. 1C. In FIGS. 2A, 2B, and 3, for convenience of the description, only the positive electrode plate 110 and the tabs 122 and 124 attached to the electrode plate 110 are illustrated.

As described above, the jelly roll illustrated in FIG. 1C is formed by winding the electrode plate 110, to which the tabs 122 and 124 shown in FIG. 1B are attached, together with an electrode plate having an opposite polarity and a separator interposed between the electrode plates.

In this case, positions of the tabs 122 and 124 may be changed (that is, positions of the non-coated portions 112 and 114, to which the tabs are attached, may be changed) during the winding according to a thickness deviation of the electrode plate or the separator and/or the like (e.g., the position of the second tab 124 relative to the first tab 122 in the wound jelly roll may change from a set or predetermined radially overlapping position due to the thickness deviation of the electrode plate or the separator).

For example, the thickness of the wound jelly roll may deviate from a set or predetermined thickness, and the thickness deviation may become more aggravated as the winding continues and the diameter of the jelly roll becomes greater (e.g., a thickness deviation of the electrode plate or the separator is accumulated according to the progress of the winding). Accordingly, the positions of the first non-coated portion and the second non-coated portion, particularly, the position of the second non-coated portion 114 existing at a position far (e.g., further away) from the winding center C, may be relatively largely changed. This may result in the change of the position of the second tab, so that the first tab and the second tab may be misaligned (e.g., the first tab and the second tab may not overlap with each other radially).

According to the exemplary embodiment of the present invention, the first and second non-coated portions 112 and 114 have different widths, thereby making it easy to respond to (e.g., to adjust to) the change of the positions of the tabs.

For example, in a first exemplary embodiment, as illustrated in FIG. 2A, the second non-coated portion 114 is formed to have a larger width than that of the first non-coated portion 112 (a<b), and a position relation of the first and second non-coated portions 112 and 114 on the electrode plate 110 is set as described below. That is, the first and second non-coated portions 112 and 114 are positioned so that the first non-coated portion 112 is positioned between the winding center C of the jelly roll and the second non-coated portion 114 after the winding of the electrode plate 110 (that is, the first non-coated portion 112 is disposed to be closer to the winding center of the jelly roll than the second non-coated portion 114, and the second non-coated portion 114 is disposed at the outer side of the first non-coated portion 112 after the winding of the electrode plate), and so as to have an overlap section S having a width equal to or larger than that of any one of the first tab 122 and the second tab 124 therebetween. In this case, as illustrated in FIG. 2A, the first and second tabs 122 and 124 may have the same width, therefore, (e.g., it is assumed that) a width of the overlap section S is equal to or larger than the width of the first tab 122 (or any one of the first and second tabs 122 and 124). Because in this case, the first and second tabs 122 and 124 have the same width, the width of the overlap section S may also be described as equal to or larger than the width of the second tab.

In the overlap section S, as illustrated in FIG. 1C, the first tab and the second tab may be aligned in a row (e.g., overlapped radially), and finally, the portions of the first tab and the second tab protruding to the outside of the jelly roll may be bonded together while overlapping (e.g., completely overlapping) each other, and welded to the CID (or the can).

Here, when the position of the second tab 124 is changed (that is, the position of the second non-coated portion 114 is changed (e.g., from a set or predetermined position that would overlap, e.g., completely overlap, with the first tab 122 in the formed jelly roll), according to the exemplary embodiment of the present invention, the second tab may be moved and attached to a new position within a range of the set or predetermined width b of the second non-coated portion (e.g., a new position where the second tab would overlap with the first tab), so that it is possible to easily respond to the change in the position of the second tab. The reason is that the width b of the second non-coated portion is formed to be large (e.g., larger than the width of the first non-coated portion), so that the second non-coated portion still has a margin width for attaching the second tab even though the position of the second tab is changed (e.g., even though the original position of the second tab prior to the moving and attaching is changed to be not overlapping with the first tab radially). That is, even after the position of the second tab is changed, the first non-coated portion and the second non-coated portion still have the overlap section S having the width equal to or larger than the width of the first tab for aligning the first and second tabs.

The case where the position of the second tab is changed is illustrated in more detail in FIG. 2B.

For example, when the change in the position of the second tab 124 of FIG. 2A is generated (that is, the change in the position of the second non-coated portion 114 is generated) in a clockwise direction, in the structure of the electrode assembly according to the exemplary embodiment of the present invention, there still exists the overlap section S having the width equal to or larger than the width of the first tab between the first and second non-coated portions illustrated in FIG. 2B, so that the second tab 124 may be moved in a counterclockwise direction in response to the change of the position and be attached to a new position on the second non-coated portion 114. Accordingly, the first tab and the second tab may be aligned in a row again, and the protruding portions of the first tab and the second tab may be bonded while overlapping (e.g., completely overlapping) each other and easily welded to the CID (or the can) as illustrated in FIG. 1C.

Further, a case where the larger change in the position of the second tab 124 is generated will be described with reference to FIG. 3. The case of FIG. 3 is substantially the same as the aforementioned cases of FIGS. 2A and 2B except that a width d of the second tab 124 is smaller than a width c of the first tab 122 (a<b and c>d).

Referring to FIG. 3, the larger change in the position of the second tab 124 is generated compared to the case of FIG. 2B, and the first and second non-coated portions 112 and 114 have the overlap section S, but the overlap section S has a width smaller than the width of the first tab 122, so that the second tab 124 having the same width as the width of the first tab 122 of the cases of FIGS. 2A and 2B cannot respond to the large change in the position of the second tab 124 (e.g., cannot be moved to fit in the overlap section S). Accordingly, in FIG. 3, the width d of the second tab 124 is configured to be smaller than the width c of the first tab 122, so that the second tab 124 may exist (e.g., fit) within the overlap section S so that the first tab and the second tab may be aligned in a row. That is, the first and second non-coated portions 112 and 114 have the overlap section S having the width equal to or larger than the width of the second tab 124, which has a smaller width between the first tab 122 and the second tab 124.

Accordingly, even when the considerable large change in the position of the second tab 124 (that is, the change in the position of the second non-coated portion 114) is generated in the clockwise direction, the overlap section S between the first and second non-coated portions illustrated in FIG. 3 still exists, so that the second tab 124 may be moved in the counterclockwise direction in response to the change in the position and be attached to a new position on the second non-coated portion 114. The first tab and the second tab may be aligned in a row again, and thus, the protrusion portions of the first and second tabs may be bonded while overlapping (e.g., completely overlapping) each other and easily welded to the CID (or the can) as illustrated in FIG. 1C.

Here, as illustrated in FIGS. 2A to 3, the overlap section S may be defined by a region, in which an angle a (defined by virtual lines L1 and L2 passing through the winding center C and both ends of the first non-coated portion 112, respectively) and an angle β (defined by virtual lines L3 and L4 passing through the winding center C and both ends of the second non-coated portion 114, respectively) overlap. That is, when any one of the first tab and the second tab is laid on (e.g., when any one of the first tab and the second tab may fit into) the first or the second non-coated portion 112 or 114 within the region (i.e., the overlap section S), in which the angle a overlaps the angle β, the first and second non-coated portions may be considered to have the overlap section (e.g., have the overlap section sufficient) for aligning the tabs. Further, in a case where the widths of the first tab and the second tab are different from each other, when the tab having the smaller width between the first tab and the second tab is laid on (e.g., may fit into) the second non-coated portion (e.g., the non-coated portion further away from the winding core), the first and second non-coated portions may be considered to have the overlap section (e.g., have the overlap section sufficient) for aligning the tabs.

As described above, according to the exemplary embodiment of the present invention, the overlap section S between the first non-coated portion and the second non-coated portion is expandably distributed, so that even though the position of the tab (e.g., one of the tabs, e.g., the second tab) is changed, it is possible to easily align the tabs by freely moving the tab (e.g., the second tab). Accordingly, the portions of the tabs protruding to the outside of the jelly roll are aligned in a row, so that the protruding portions of the tabs may be bonded while overlapping (e.g., completely overlapping) each other. As a result, it is easy to weld the protruding portions of the tab to the CID (or the can).

Hereinafter, a second exemplary embodiment of the present invention will be described with reference to FIGS. 4A, 4B, and 5.

The second exemplary embodiment is substantially the same as the case of the first exemplary embodiment except that a first non-coated portion 112' is formed to have a larger width than that of a second non-coated portion 114' (a>b), and a first tab 122' may have a smaller width than that of a second tab 124'.

As illustrated in FIG. 4A, the first non-coated portion 112' is formed to have a larger width than that of the second non-coated portion 114' (a>b), and a position relation of the first and second non-coated portions 112' and 114' on an electrode plate 110' is set as described below. That is, the first and second non-coated portions 112' and 114' are positioned so that the first non-coated portion 112' is laid between a winding center C of a jelly roll and the second non-coated portion 114' after the winding of the electrode plate 110', and so as to have an overlap section S having a width equal to or larger than a width of any one of the first tab 122' and the second tab 124' therebetween. In this case, as illustrated in FIG. 4A, the first and second tabs 122' and 124' may have the same width, so that (e.g., it is assumed that) a width of the overlap section S is equal to or larger than the width of the first tab 122' (or any one of the first and second tabs 122' and 124'). Because in this case, the first and second tabs 122' and 124' have the same width, the width of the overlap section S may also be described as equal to or larger than the width of the second tab.

In the overlap section S, the first tab and the second tab may be aligned in a row, and finally, the portions protruding to the outside of the jelly roll of the first tab and the second tab may be bonded while overlapping (e.g., completely overlapping) each other and easily welded to the CID (or the can).

Here, when the position of the second tab 124' is changed (that is, the position of the second non-coated portion 114' is changed), according to the exemplary embodiment of the present invention, the first tab may be moved and attached to a new position within a range of the set or predetermined width a of the first non-coated portion, so that it is possible to easily respond to the change in the position of the second tab. The reason is that the width a of the first non-coated portion is formed to be large (e.g., larger than that of the second non-coated portion), so that the first non-coated portion still has an attachment margin width of the first tab for the alignment with the second tab even though the position of the second tab is changed. That is, even after the position of the second tab is changed, the first non-coated portion and the second non-coated portion still have the overlap section S having the width equal to or larger than the width of the first tab for aligning the first and second tabs.

The case where the position of the second tab is changed is illustrated in more detail in FIG. 4B.

For example, when the change in the position of the second tab 124' of FIG. 4A is generated (that is, the change in the position of the second non-coated portion 114' is generated) in a clockwise direction, in the structure of the electrode assembly according to the exemplary embodiment of the present invention, there exists the overlap section S having the width equal to or larger than the width of the first tab between the first and second non-coated portions illustrated in FIG. 4B, so that the first tab 122' may also be move in a counterclockwise direction in response to the change of the position and be attached to a new position on the first non-coated portion 112'. Accordingly, the first tab and the second tab may be aligned in a row again, and the protruding portions of the first tab and the second tab may be bonded while overlapping (e.g., completely overlapping) each other and easily welded to the CID (or the can).

Further, a case where the larger change in the position of the second tab 124' is generated will be described with reference to FIG. 5. The case of FIG. 5 is substantially the same as the aforementioned cases of FIGS. 4A and 4B except that a width c of the first tab 122' is smaller than a width d of the second tab 124' (a>b and c<d).

Referring to FIG. 5, the larger change in the position of the second tab 124' is generated compared to the case of FIG. 4B, and the first and second non-coated portions 112' and 114' have the overlap section S, but the overlap section S has a width smaller than the width of the first tab 122', so that the first tab 122' having the same width as the width of the second tab 124' of the cases of FIGS. 4A and 4B cannot respond to the large change in the position of the second tab 124' (e.g., cannot be moved to fit in the overlap section S). Accordingly, in FIG. 5, a width c of the first tab 122' is configured to be smaller than a width d of the second tab 124', so that the first tab 122' may exist (e.g., fit) within the overlap section S, and the first tab 122' and the second tab 124' may be aligned in a row. That is, the first and second non-coated portions 112' and 114' have the overlap section S having the width equal to or larger than the width of the first tab 122', which has a smaller width between the first tab 122' and the second tab 124'.

Accordingly, even when the considerable large change in the position of the second tab 124' (that is, the change in the position of the second non-coated portion 114') is generated in the clockwise direction, the overlap section S between the first and second non-coated portions illustrated in FIG. 5 still exists, so that the first tab 122' may also be moved in the counterclockwise direction in response to the change in the position and be attached to a new position on the first non-coated portion 112'. The first tab and the second tab may be aligned in a row again, and thus, the protrusion portions of the first and second tabs may be bonded while overlapping (e.g., completely overlapping) each other and easily welded to the CID (or the can) as illustrated in FIG. 10.

As described above, in the electrode assembly 100 according to the exemplary embodiment of the present invention, the first non-coated portion and the second non-coated portion have different widths, so that it is possible to effectively respond to a change in a position of the tab which may be generated by a thickness deviation of the electrode plate or the separator when the jelly roll is formed.

Accordingly, the first non-coated portion is positioned closer to the winding center than the second non-coated portion, and the second non-coated portion is positioned at the outer side of the first non-coated portion after the winding. The first and second non-coated portions (having different widths from each other) have a widely distributed overlap section. The overlap section has a width equal to or larger than the tab (e.g., the tab with a smaller width) therebetween, so that the first and second non-coated portions may have a margin width for offsetting the change in the position of the tab.

Further, the width of the tab attached to the non-coated portion having a larger width between the first and second non-coated portions is formed to be smaller than the width of the other tab, thereby securing the larger overlap section.

FIG. 6 is a perspective view of an exterior appearance of a secondary battery including the electrode assembly according to an exemplary embodiment of the present invention.

Further, FIG. 7 is an exploded perspective view taken along line I-I' of FIG. 6.

As illustrated in FIGS. 6 and 7, a secondary battery 10 according to an exemplary embodiment of the present invention includes the aforementioned electrode assembly 100, and further may include a plurality of insulating plates 230 and 240, a . center pin 250, a can 200 accommodating the electrode assembly, a gasket 260 sealing an opening of the can, and a cap assembly 270.

The electrode assembly 100 includes positive and negative electrode plates 110 and 130, and a separator 150, and the separator 150 is interposed between the positive and negative electrode plates 110 and 130, which is described above. The positive electrode plate 110, the separator 150, and the negative electrode plate 130 may be sequentially laminated, and then wound in the form of a jelly roll.

The electrode assembly 100 may include a plurality of tabs 120 electrically connected to the positive electrode plate 110 and one tab 140 electrically connected to the negative electrode plate 130. Energy generated by the electrode assembly 100 is transmitted to the outside by the tabs 120 and 140. Each of the tabs includes a conductive material, for example, nickel (Ni) or a nickel alloy.

The can 200 is a cylinder which has one opened end and is provided with a space accommodating the electrode assembly 100. The tab 140 of the negative electrode plate may be welded to a bottom surface of the can 200, so that the can may serve as an electrode terminal. The can 200 may be formed of stainless steel, aluminum, or other suitable equivalent materials, but is not limited thereto. The plurality of insulating plates 230 and 240 includes the first insulating plate 240 provided at a side at which the electrode assembly 100 faces the opening of the can 200, and the second insulating plate 230 provided at a side at which the electrode assembly 100 faces an opposite surface of the opening, that is, the bottom surface, of the can 200. By the first and second insulating plates 240 and 230, it is possible to prevent an unnecessary electric short between the electrode assembly 100 and the can 200.

The first insulating plate 240 may include a plurality of holes so that an electrolyte may permeate the electrode assembly 100 well. Further, the first insulating plate 240 may include a hole, through which the tab 120 of the positive electrode plate drawn out from the electrode assembly 100 passes. The second insulating plate 230 includes a plurality of holes, so that a space decreased by the second insulating plate is reduced or minimized, thereby reducing or minimizing a decrease of the amount of the injected electrolyte.

The center pin 250 is provided at a center of the electrode assembly and supports the electrode assembly 100 so that the electrode assembly 100 is not loosened. The center pin 250 may be a cylindrical rod provided with a hollow hole (e.g., a hollow core), and one end thereof may press on the tab 140 of the negative electrode plate to make the negative electrode plate be in close contact with the can 200.

When the hollow hole is formed in the center pin 250, the center pin 250 may serve as a movement passage of gas generated by the electrode assembly 100. Each of the first insulating plate 240 and the second insulating plate 230 is provided with a hole at a center portion corresponding to the center pin 250, so that gas is discharged.

The center pin 250 may include a plurality of holes at a lateral surface thereof so that the electrolyte is easily impregnated and the gas generated by the electrode assembly 100 is smoothly discharged.

A clamping portion 213 bent inwardly is formed at a border of the opening of the can 200. The clamping portion 213 presses the cap assembly 270 to improve the fastening force. The can 200 includes a bead 210 convexly formed inwardly between the opening of the can 200 and the electrode assembly 100. An inner diameter of the bead 210 is formed to be smaller than an outer diameter of the electrode assembly 100, so that the electrode assembly is fixed so as not to move in the can 200.

The cap assembly 270 may include a cap up 217 (serving as an electrode terminal) and safe components (for example, the CID) provided between the cap up 217 and the electrode assembly 100. The safe components include a positive temperature coefficient element 272, a vent 273, an insulating material 276, a cap down 277, and a plate 271, which are sequentially laminated.

The positive temperature coefficient element 272 blocks a current when an overcurrent flows. The vent 273 includes a protruding portion 275 provided at a center thereof. The protruding portion 275 protrudes toward a hole provided at a center of the cap down 277. The protruding portion 275 may protrude so as to almost pass through the hole provided at the center of the cap down 277 to meet the plate 271.

The cap down 277 includes a hole serving as a passage so that when the pressure within a secondary battery is increased, the pressure is applicable to the vent 273. The plate 271 is in close contact with the cap down 277 between the electrode assembly 100 and the cap down 277 so as to block the hole provided at the center of the cap down 277. The plate 271 may be electrically connected to the protruding portion 275 of the vent 273 by a welding method and/or the like. The vent 273 and the cap down 277 are insulated by the insulating material 276 provided between the vent 273 and the cap down 277.

The vent 273 is provided with a circular or cross recess 274 around the protruding portion 275. When gas is generated inside the secondary battery and pressure is increased, the protruding portion 275 of the vent 273 moves to (e.g., moves towards) the cap up 217. A connection portion of the plate 271 and the protruding portion 275 are separated or a portion of the plate 271 is cut while the vent 273 is deformed as described above, so that an electrical flow is blocked. When the pressure of the battery is continuously increased, the recess 274 is broken and the gas is discharged to the outside.

The gasket 260 is provided between the opening of the can 200 and the cap assembly 270 to seal the opening of the can 200. The gasket 260 surrounds an outer peripheral surface of the cap assembly 270 to insulate the can 200 from the cap up 217 and/or the like. The gasket 260 is formed of an insulating and elastic material.

The plurality of tabs 120 of the positive electrode plate are electrically connected to each other. Any one of the plurality of tabs 120 of the positive electrode plate is electrically connected to the plate 271 or the cap down 277 by a welding method and/or the like.

In this case, according to the exemplary embodiment of the present invention, it is possible to easily align the plurality of tabs 120, for example, the first and second tabs 122 and 124, which form the multi-tab structure described with reference to FIGS. 1A to 5, and thus, it is possible to easily weld the multi-tab structure to the CID and/or to the can.

The use of "may" when describing embodiments of the present invention refers to "one or more embodiments of the present invention." Also, the term "exemplary" is intended to refer to an example or illustration. It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. In contrast, when an element or layer is referred to as being "directly on," "directly connected to", "directly coupled to", or "immediately adjacent to" another element or layer, there are no intervening elements or layers present. As used herein, the term "substantially," "about," and similar terms are used as terms of approximation and not as terms of degree, and are intended to account for the inherent deviations in measured or calculated values that would be recognized by those of ordinary skill in the art.

The specified matters and embodiments and drawings such as specific apparatus drawings of the present invention have been disclosed for illustrative purposes only, but the scope of the present invention is not limited thereto, and those skilled in the art will appreciate that various modifications, additions and substitutions are possible from the disclosure in the art to which the present invention belongs. The spirit of the present invention is defined by the appended claims, and equivalents thereof, rather than by the description preceding them, and all changes and modifications that fall within metes and bounds of the claims, or equivalents of such metes and bounds are therefore intended to be embraced by the range of the spirit of the present invention.

What is claimed is:

1. An electrode assembly, comprising:
   a jelly roll comprising a first electrode plate wound together with a second electrode plate, the second electrode plate having a different polarity from the first electrode plate,
   wherein the first electrode plate includes a plurality of non-coated portions spaced apart from each other; and
   a plurality of tabs attached to the plurality of non-coated portions, respectively,
   wherein the plurality of non-coated portions includes a first non-coated portion having a first width, and a second non-coated portion having a second width different from the first width of the first non-coated portion, and
   wherein the first non-coated portion is between a winding center of the jelly roll and the second non-coated portion and spaced apart from the winding center, and the second non-coated portion is between the first non-coated portion and an end of the first electrode plate opposite to the center of the jelly roll and spaced apart from the end of the first electrode plate.

2. The electrode assembly of claim 1, wherein the first non-coated portion and the second non-coated portion have an overlap section having a width equal to or larger than a width of any one of the plurality of tabs therebetween.

3. The electrode assembly of claim 1, wherein the first non-coated portion and the second non-coated portion have an overlap section having a width equal to or larger than a width of a tab having a smallest width among the plurality of tabs.

4. The electrode assembly of claim 2, wherein the overlap section is defined by a region in which a first angle overlaps with a second angle, the first angle defined by lines passing through the winding center and both ends of the first non-coated portion, respectively, and the second angle defined by lines passing through the winding center and both ends of the second non-coated portion, respectively.

5. The electrode assembly of claim 4, wherein at least one tab among the plurality of tabs is laid on the second non-coated portion within the overlap section.

6. The electrode assembly of claim 3, wherein the overlap section is defined by a region in which a first angle overlaps with a second angle, the first angle defined by lines passing through the winding center and both ends of the first non-coated portion, respectively, and the second angle defined by lines passing through the winding center and both ends of the second non-coated portion, respectively.

7. The electrode assembly of claim 6, wherein the tab having the smallest width among the plurality of tabs is laid on the second non-coated portion within the overlap section.

8. The electrode assembly of claim 2, wherein the second non-coated portion has a larger width than that of the first non-coated portion.

9. The electrode assembly of claim 3, wherein the second non-coated portion has a larger width than that of the first non-coated portion,
the plurality of tabs includes a first tab attached to the first non-coated portion and a second tab attached to the second non-coated portion, and
the second tab has a smaller width than that of the first tab.

10. The electrode assembly of claim 2, wherein the first non-coated portion has a larger width than that of the second non-coated portion.

11. The electrode assembly of claim 3, wherein the first non-coated portion has a larger width than that of the second non-coated portion,
the plurality of tabs includes a first tab attached to the first non-coated portion and a second tab attached to the second non-coated portion, and
the first tab has a smaller width than that of the second tab.

12. An electrode assembly, comprising:
a jelly roll comprising a first electrode plate wound together with a second electrode plate, the second electrode plate having a different polarity from the first electrode plate,
wherein the first electrode plate includes a plurality of non-coated portions spaced apart from each other; and
a plurality of tabs attached to the plurality of non-coated portions, respectively,
wherein the plurality of tabs includes a first tab having a first width, and a second tab having a second width different from the first width of the first tab, and
wherein the plurality of non-coated portions comprises a first non-coated portion and a second non-coated portion, the first non-coated portion is between a winding center of the jelly roll and the second non-coated portion and spaced apart from the winding center, and the second non-coated portion is between the first non-coated portion and an end of the first electrode plate opposite to the winding center of the jelly roll and spaced apart from the end of the first electrode plate.

13. The electrode assembly of claim 12, wherein the first tab is between a winding center of the jelly roll and the second tab, and
the second tab has a smaller width than that of the first tab.

14. A secondary battery comprising the electrode assembly of claim 1.

15. A secondary battery comprising the electrode assembly of claim 12.

16. The electrode assembly of claim 1, wherein a center of the first non-coated portion is offset from a center of the second non-coated portion along a radial direction of the jelly roll.

* * * * *